United States Patent
Rouse et al.

(10) Patent No.: US 6,748,742 B2
(45) Date of Patent: Jun. 15, 2004

(54) MICROTURBINE COMBINATION SYSTEMS

(75) Inventors: Gregory C. Rouse, Westlake Village, CA (US); William Treece, La Mesa, CA (US); Jeff Willis, Los Angeles, CA (US)

(73) Assignee: Capstone Turbine Corporation, Chatsworth, CA (US)

( * ) Notice: Subject to any disclaimer, the term of this patent is extended or adjusted under 35 U.S.C. 154(b) by 113 days.

(21) Appl. No.: 10/008,047

(22) Filed: Nov. 7, 2001

(65) Prior Publication Data

US 2002/0108371 A1 Aug. 15, 2002

Related U.S. Application Data (60) Provisional application No. 60/246,624, filed on Nov. 7, 2000.

(51) Int. Cl.⁷ ............................................... F02B 33/44
(52) U.S. Cl. ................................. 60/611; 60/605.1
(58) Field of Search ........................... 60/605.1, 611, 60/676, 664, 667

(56) References Cited

U.S. PATENT DOCUMENTS

| | | | | |
|---|---|---|---|---|
| 4,048,012 A | * | 9/1977 | George et al. | 376/298 |
| 4,087,860 A | * | 5/1978 | Beatty et al. | 700/290 |
| 4,103,178 A | * | 7/1978 | Yannone et al. | 290/40 R |
| 4,541,247 A | * | 9/1985 | Martin | 60/660 |
| 4,745,758 A | * | 5/1988 | Putman et al. | 60/676 |
| 5,315,816 A | * | 5/1994 | Kemmer et al. | 60/782 |
| 5,579,631 A | * | 12/1996 | Chen et al. | 60/775 |

\* cited by examiner

*Primary Examiner*—Hoang Nguyen
(74) *Attorney, Agent, or Firm*—Waddey & Patterson; Lucian Wayne Beavers (57) ABSTRACT

According to the present disclosure, a turbogenerator system may be combined with other heat/energy sources. A simple cycle or recuperated cycle turbogenerator have a variety of fuel options and grid connect or stand alone capability that can be combined with one or more external heat sources such as a Solar Collector/Receiver Heat Energy System, a Bio-mass Gasifier/Combustor Heat Energy System, a Fuel Cell Heat/Energy System, a Nuclear Heat/Energy System, a Waste Heat/Energy System, or some other suitable Heat/Energy System. The above external heat systems can be used to provide all of part of the heat/energy input to operate the turbogenerator and achieve electrical output, as well as a turbogenerator hot exhaust flow that has potential for other uses. Using an integral turbogenerator low emission combustor and fuel control as part of these combined systems has additional advantages. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

9 Claims, 8 Drawing Sheets

MICROTURBINE COMBINATION SYSTEMS

RELATED APPLICATIONS

This application claims the priority of U.S. provisional patent application Ser. No. 60/246,624 filed Nov. 7, 2000.

BACKGROUND OF THE INVENTION

1. Field of the Invention

This invention relates to power generation systems, and more specifically to distributed turbogenerator hybrid power systems.

2. Description of the Prior Art

Conventional turbogenerator systems may be confined to burning fossil fuels to drive the turbine and generate electricity. Methods and apparatus are needed to enable turbogenerators to be driven from multiple heat sources.

SUMMARY OF THE INVENTION

In a first aspect, the present disclosure provides a turbogenerator having an integral first heat source for driving the turbogenerator and one or more external heat sources for driving the turbogenerator and a controller for controlling the proportion of heat from the first heat source and the one or more external heat sources used to drive the turbogenerator and a mixer for combining the proportion of heat from the first heat source and the one or more external heat sources.

In another aspect, the present disclosure includes a method of controlling a turbogenerator including the steps, providing and integral heat source for driving the turbogenerator, and providing one or more external heat sources for driving the turbogenerator, and selecting a priority for the integral heat source and for the one or more external heat sources, and controlling the heat applied to drive the turbogenerator according to the selected priorities.

These and other features and advantages of this invention will become further apparent from the detailed description and accompanying figures that follow. In the figures and description, numerals indicate the various features of the invention, like numerals referring to like features throughout both the drawings and the description.

DETAILED DESCRIPTION OF THE PREFERRED EMBODIMENT(S)

Figure 1A:
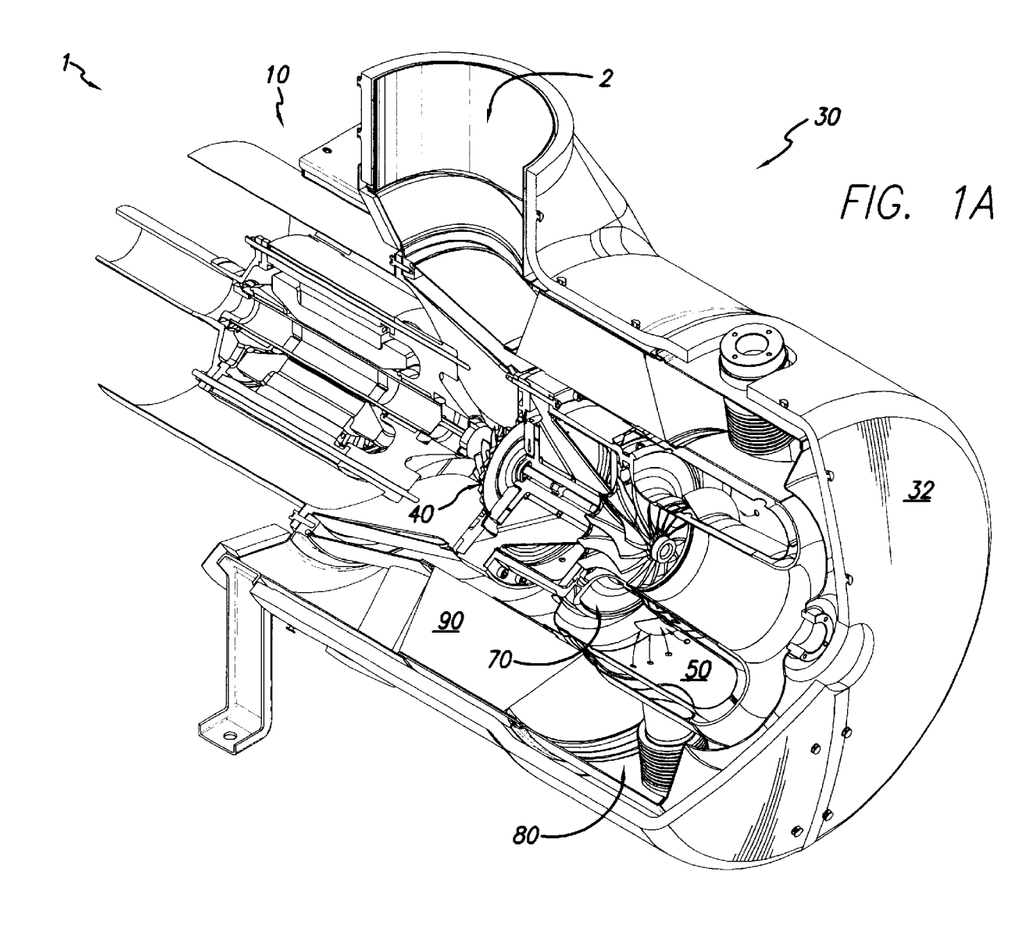
FIG. 1A is perspective view, partially in section, of an integrated turbogenerator system.

With reference to FIG. 1A, an integrated turbogenerator 1 according to the present disclosure generally includes motor/generator section 10 and compressor-turbine section 30. Compressor- turbine section 30 includes exterior can 32, compressor 40, combustor 50 and turbine 70. A recuperator 90 may be optionally included.

Figure 1B:
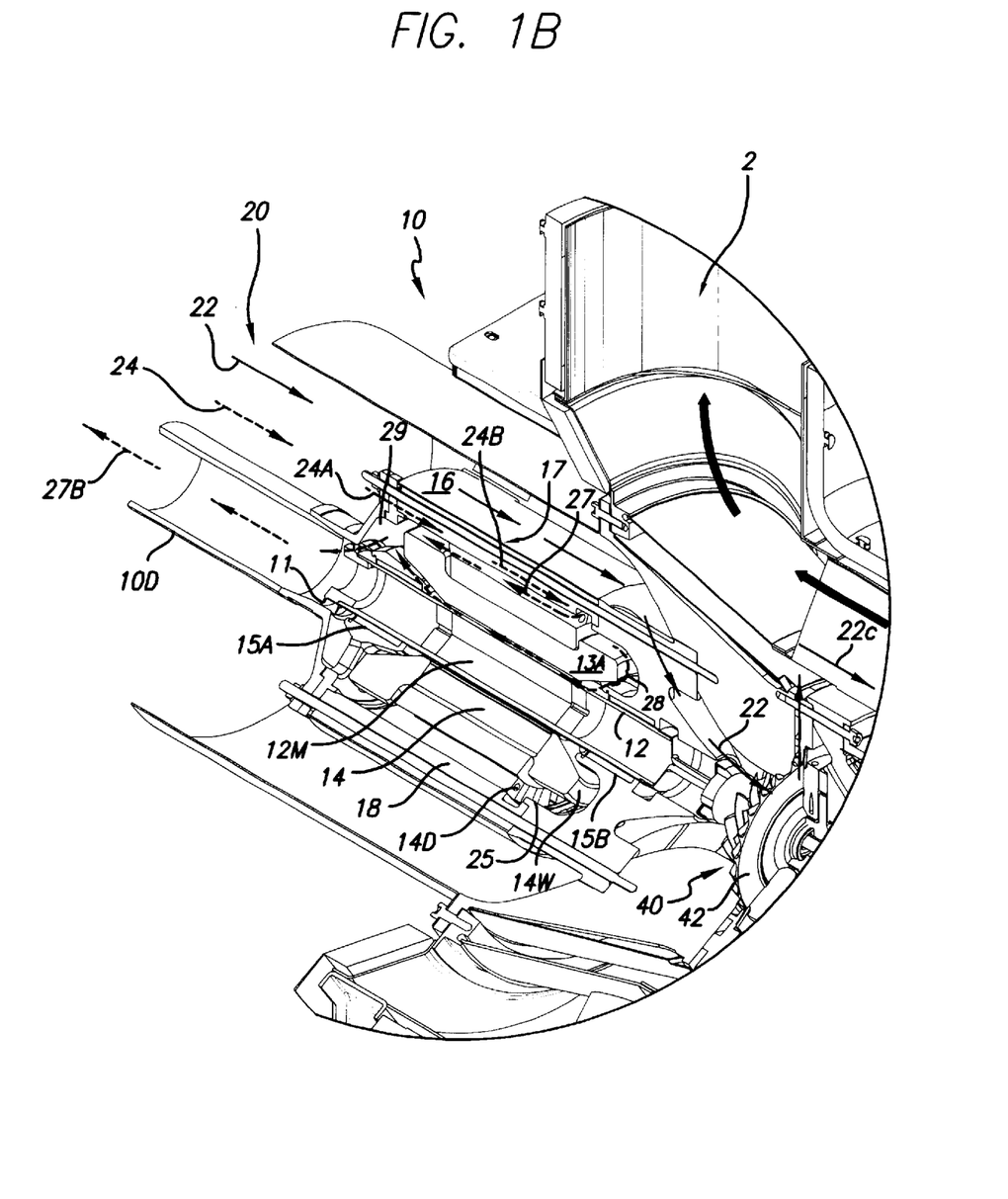
FIG. 1B is a magnified perspective view, partially in section, of the motor/generator portion of the integrated turbogenerator of FIG. 1A.
Figure 1C:
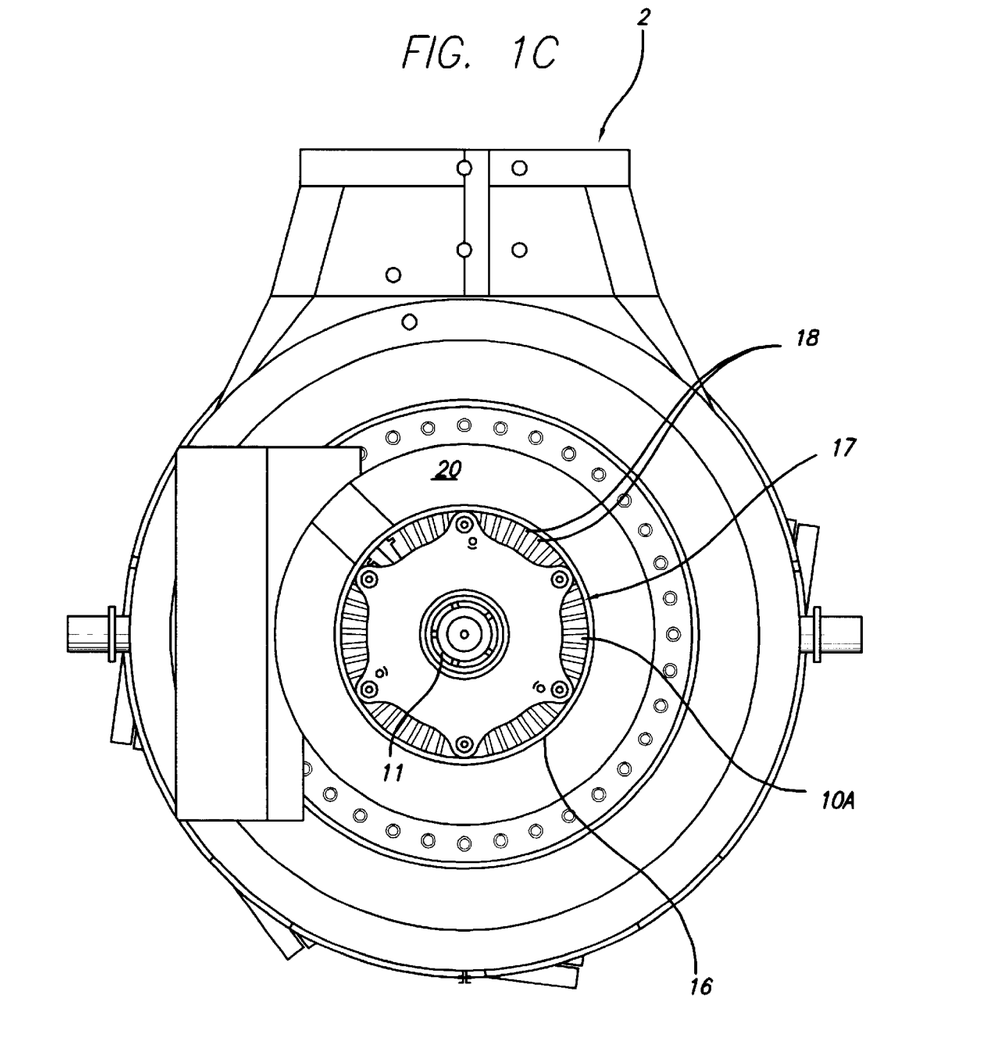
FIG. 1C is an end view, from the motor/generator end, of the integrated turbogenerator of FIG. 1A.

Referring now to FIG. 1B and FIG. 1C, in a currently preferred embodiment of the present disclosure, motor/generator section 10 may be a permanent magnet motor generator having a permanent magnet rotor or sleeve 12. Any other suitable type of motor generator may also be used. Permanent magnet rotor or sleeve 12 may contain a permanent magnet 12M. Permanent magnet rotor or sleeve 12 and the permanent magnet disposed therein are rotatably supported within permanent magnet motor/generator stator 14. Preferably, one or more compliant foil, fluid film, radial, or journal bearings 15A and 15B rotatably support permanent magnet rotor or sleeve 12 and the permanent magnet disposed therein. All bearings, thrust, radial or journal bearings, in turbogenerator 1 may be fluid film bearings or compliant foil bearings. Motor/generator housing 16 encloses stator heat exchanger 17 having a plurality of radially extending stator cooling fins 18. Stator cooling fins 18 connect to or form part of stator 14 and extend into annular space 10A between motor/generator housing 16 and stator 14. Wire windings 14W exist on permanent magnet motor/generator stator 14.

Figure 1D:
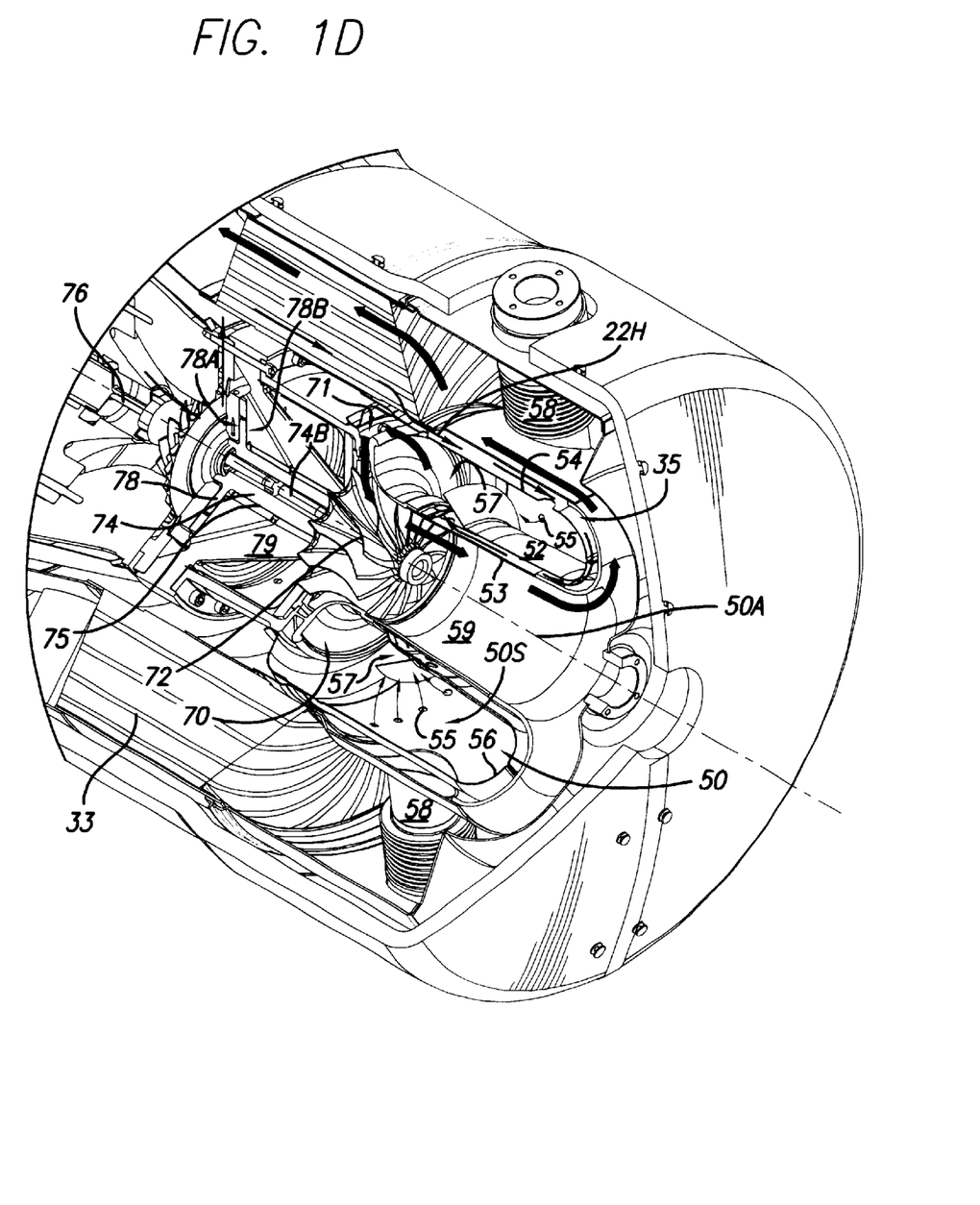
FIG. 1D is a magnified perspective view, partially in section, of the combustor-turbine exhaust portion of the integrated turbogenerator of FIG. 1A.
Figure 2:
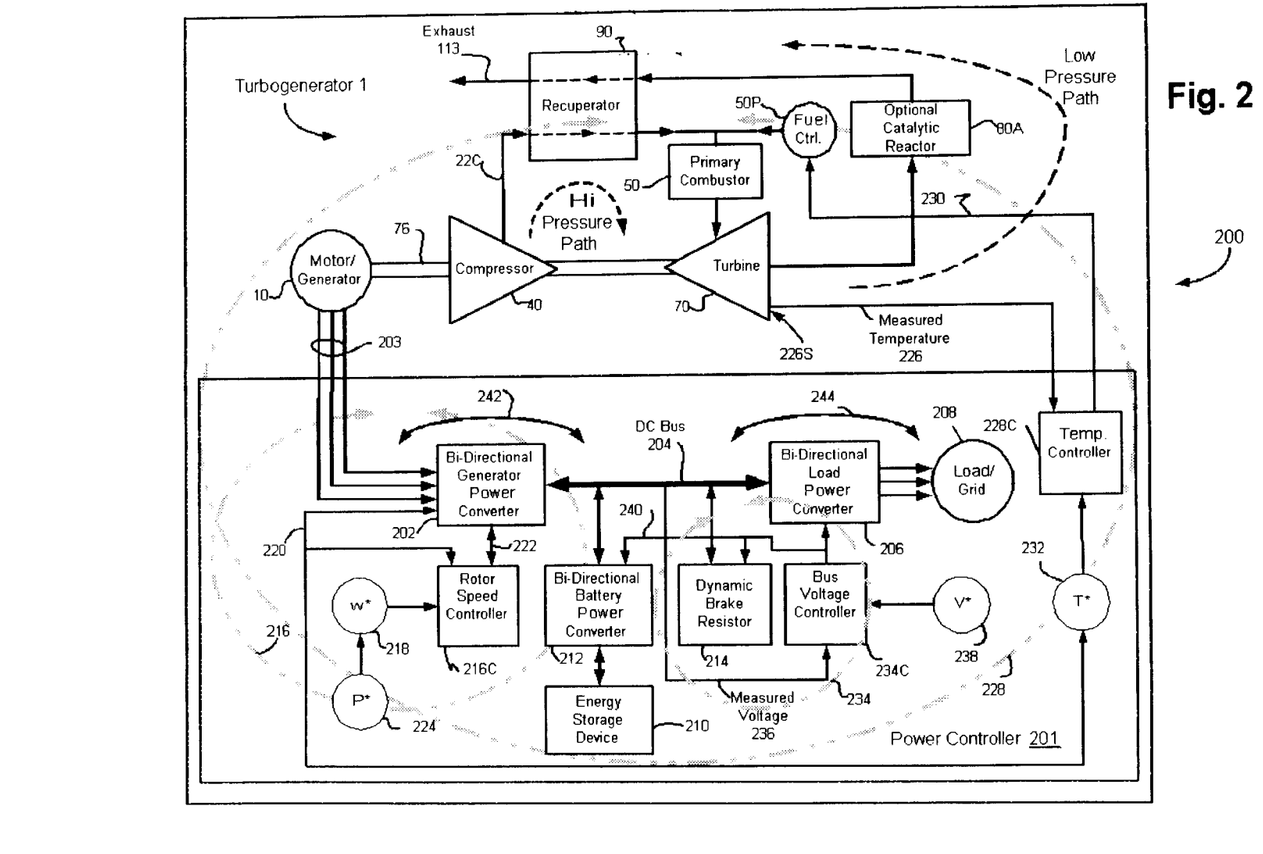
FIG. 2 is a block diagram schematic of a turbogenerator system including a power controller having decoupled rotor speed, operating temperature, and DC bus voltage control loops.

Referring now to FIG. 1D, combustor 50 may include cylindrical inner wall 52 and cylindrical outer wall 54. Cylindrical outer wall 54 may also include air inlets 55. Cylindrical walls 52 and 54 define an annular interior space 50S in combustor 50 defining an axis 51. Combustor 50 includes a generally annular wall 56 further defining one axial end of the annular interior space of combustor 50. Associated with combustor 50 may be one or more fuel injector inlets 58 to accommodate fuel injectors which receive fuel from fuel control element 50P as shown in FIG. 2, and inject fuel or a fuel air mixture to interior of 50S combustor 50. Inner cylindrical surface 53 is interior to cylindrical inner wall 52 and forms exhaust duct 59 for turbine 70.

Turbine 70 may include turbine wheel 72. An end of combustor 50 opposite annular wall 56 further defines an aperture 71 in turbine 70 exposed to turbine wheel 72. Bearing rotor 74 may include a radially extending thrust bearing portion, bearing rotor thrust disk 78, constrained by bilateral thrust bearings 78A and 78B. Bearing rotor 74 may be rotatably supported by one or more journal bearings 75 within center bearing housing 79. Bearing rotor thrust disk 78 at the compressor end of bearing rotor 74 is rotatably supported preferably by a bilateral thrust bearing 78A and 78B. Journal or radial bearing 75 and thrust bearings 78A and 78B may be fluid film or foil bearings.

Turbine wheel 72, Bearing rotor 74 and Compressor impeller 42 may be mechanically constrained by tie bolt 74B, or other suitable technique, to rotate when turbine wheel 72 rotates. Mechanical link 76 mechanically constrains compressor impeller 42 to permanent magnet rotor or sleeve 12 and the permanent magnet disposed therein causing permanent magnet rotor or sleeve 12 and the permanent magnet disposed therein to rotate when compressor impeller 42 rotates.

Figure 1E:
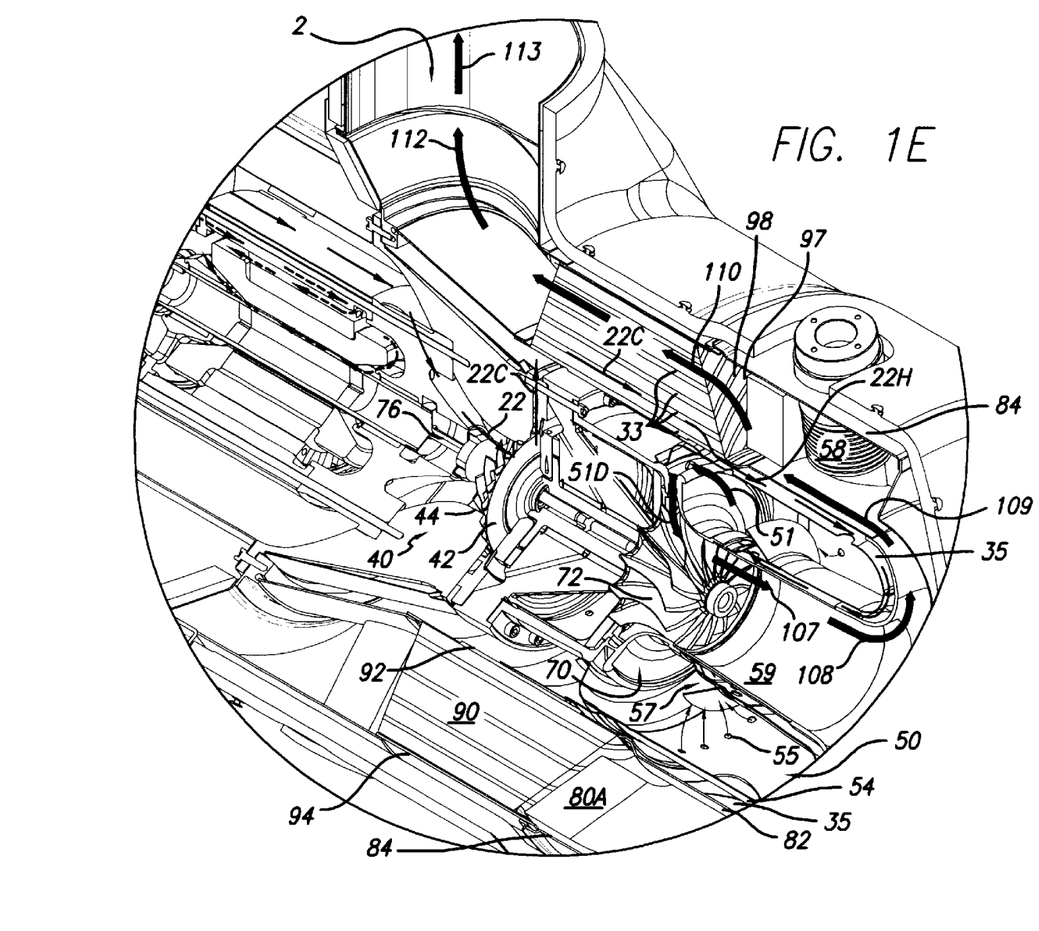
FIG. 1E is a magnified perspective view, partially in section, of the compressor-turbine portion of the integrated turbogenerator of FIG. 1A.

Referring now to FIG. 1E, compressor 40 may include compressor impeller 42 and compressor impeller housing 44. Recuperator 90 may have an annular shape defined by cylindrical recuperator inner wall 92 and cylindrical recuperator outer wall 94. Recuperator 90 contains internal passages for gas flow, one set of passages, passages 33 connecting from compressor 40 to combustor 50, and one set of passages, passages 97, connecting from turbine exhaust 80 to turbogenerator exhaust output 2.

Referring again to FIG. 1B and FIG. 1C, in operation, air flows into primary inlet 20 and divides into compressor air 22 and motor/generator cooling air 24. Motor/generator cooling air 24 flows into annular space 10A between motor/generator housing 16 and permanent magnet motor/generator stator 14 along flow path 24A. Heat is exchanged from stator cooling fins 18 to generator cooling air 24 in flow path 24A, thereby cooling stator cooling fins 18 and stator 14 and forming heated air 24B. Warm stator cooling air 24B exits stator heat exchanger 17 into stator cavity 25 where it further divides into stator return cooling air 27 and rotor cooling air 28. Rotor cooling air 28 passes around stator end 13A and travels along rotor or sleeve 12. Stator return cooling air 27 enters one or more cooling ducts 14D and is conducted through stator 14 to provide further cooling. Stator return cooling air 27 and rotor cooling air 28 rejoin in stator cavity 29 and are drawn out of the motor/generator 10 by exhaust fan 11 which is connected to rotor or sleeve 12 and rotates with rotor or sleeve 12. Exhaust air 27B is conducted away from primary air inlet 20 by duct 10D.

Referring again to FIG. 1E, compressor 40 receives compressor air 22. Compressor impeller 42 compresses compressor air 22 and forces compressed gas 22C to flow into a set of passages 33 in recuperator 90 connecting compressor 40 to combustor 50. In passages 33 in recuperator 90, heat is exchanged from walls 98 of recuperator 90 to compressed gas 22C. As shown in FIG. 1E, heated compressed gas 22H flows out of recuperator 90 to space 35 between cylindrical inner surface 82 of turbine exhaust 80 and cylindrical outer wall 54 of combustor 50. Heated compressed gas 22H may flow into combustor 54 through sidewall ports 55 or main inlet 57. Fuel (not shown) may be reacted in combustor 50, converting chemically stored energy to heat. Hot compressed gas 51 in combustor 50 flows through turbine 70 forcing turbine wheel 72 to rotate. Movement of surfaces of turbine wheel 72 away from gas molecules partially cools and decompresses gas 51D moving through turbine 70. Turbine 70 is designed so that exhaust gas 107 flowing from combustor 50 through turbine 70 enters cylindrical passage 59. Partially cooled and decompressed gas in cylindrical passage 59 flows axially in a direction away from permanent magnet motor/generator section 10, and then radially outward, and then axially in a direction toward permanent magnet motor/generator section 10 to passages 98 of recuperator 90, as indicated by gas flow arrows 108 and 109 respectively.

In an alternate embodiment of the present disclosure, low pressure catalytic reactor 80A may be included between fuel injector inlets 58 and recuperator 90. Low pressure catalytic reactor 80A may include internal surfaces (not shown) having catalytic material (e.g., Pd or Pt, not shown) disposed on them. Low pressure catalytic reactor 80A may have a generally annular shape defined by cylindrical inner surface 82 and cylindrical low pressure outer surface 84. Unreacted and incompletely reacted hydrocarbons in gas in low pressure catalytic reactor 80A react to convert chemically stored energy into additional heat, and to lower concentrations of partial reaction products, such as harmful emissions including nitrous oxides (NOx).

Gas 110 flows through passages 97 in recuperator 90 connecting from turbine exhaust 80 or catalytic reactor 80A to turbogenerator exhaust output 2, as indicated by gas flow arrow 112, and then exhausts from turbogenerator 1, as indicated by gas flow arrow 113. Gas flowing through passages 97 in recuperator 90 connecting from turbine exhaust 80 to outside of turbogenerator 1 exchanges heat to walls 98 of recuperator 90. Walls 98 of recuperator 90 heated by gas flowing from turbine exhaust 80 exchange heat to gas 22C flowing in recuperator 90 from compressor 40 to combustor 50.

Turbogenerator 1 may also include various electrical sensor and control lines for providing feedback to power controller 201 and for receiving and implementing control signals as shown in FIG. 2.

Alternative Embodiments of an Integrated Turbogenerator

The integrated turbogenerator disclosed above is exemplary. Several alternative embodiments may be employed.

In one alternative embodiment, air 22 may be replaced by a gaseous fuel mixture. In this embodiment, fuel injectors may not be necessary. This embodiment may include an air and fuel mixer upstream of compressor 40.

In another alternative embodiment, fuel may be conducted directly to compressor 40, for example by a fuel conduit connecting to compressor impeller housing 44. Fuel and air may be mixed by action of the compressor impeller 42. In this embodiment, fuel injectors may not be necessary.

In another alternative embodiment, combustor 50 may be a catalytic combustor.

In still another alternative embodiment, geometric relationships and structures of components may differ from those shown in FIG. 1A. Permanent magnet motor/generator section 10 and compressor-turbine section 30 may have low pressure catalytic reactor 80A outside of annular recuperator 90, and may have recuperator 90 outside of low pressure catalytic reactor 80A. Low pressure catalytic reactor 80A may be disposed at least partially in cylindrical passage 59, or in a passage of any shape confined by an inner wall of combustor 50. Combustor 50 and low pressure catalytic reactor 80A may be substantially or completely enclosed with an interior space formed by a generally annularly shaped recuperator 90, or a recuperator 90 shaped to substantially enclose both combustor 50 and low pressure catalytic reactor 80A on all but one face.

An integrated turbogenerator is a turbogenerator in which the turbine, compressor, and generator are all constrained to rotate based upon rotation of the shaft to which the turbine is connected. The methods and apparatus disclosed herein is preferably but not necessarily used in connection with a turbogenerator, and preferably but not necessarily used in connection with an integrated turbogenerator.

Turbogenerator Control System

Referring now to FIG. 2, a preferred embodiment is shown in which a turbogenerator system 200 includes power controller 201 which has three substantially decoupled control loops for controlling (1) rotary speed, (2) temperature, and (3) DC bus voltage. A more detailed description of an appropriate power controller is disclosed in U.S. patent application Ser. No. 09/207,817, filed Dec. 8, 1998 in the names of Gilbreth, Wacknov and Wall, and assigned to the assignee of the present application which is incorporated herein in its entirety by this reference.

Referring still to FIG. 2, turbogenerator system 200 includes integrated turbogenerator 1 and power controller 201. Power controller 201 includes three decoupled or independent control loops.

A first control loop, temperature control loop 228, regulates a temperature related to the desired operating temperature of primary combustor 50 to a set point, by varying fuel flow from fuel control element 50P to primary combustor 50. Temperature controller 228C receives a temperature set point, T*, from temperature set point source 232, and receives a measured temperature from temperature sensor 226S connected to measured temperature line 226. Temperature controller 228C generates and transmits over fuel control signal line 230 to fuel pump 50P a fuel control signal for controlling the amount of fuel supplied by fuel pump 50P to primary combustor 50 to an amount intended to result in a desired operating temperature in primary combustor 50. Temperature sensor 226S may directly measure the temperature in primary combustor 50 or may measure a temperature of an element or area from which the temperature in the primary combustor 50 may be inferred.

A second control loop, speed control loop 216, controls speed of the shaft common to the turbine 70, compressor 40, and motor/generator 10, hereafter referred to as the common shaft, by varying torque applied by the motor generator to the common shaft. Torque applied by the motor generator to the common shaft depends upon power or current drawn from or pumped into windings of motor/generator 10. Bi-directional generator power converter 202 is controlled by rotor speed controller 216C to transmit power or current in or out of motor/generator 10, as indicated by bi-directional arrow 242. A sensor in turbogenerator 1 senses the rotary speed on the common shaft and transmits that rotary speed signal over measured speed line 220. Rotor speed controller 216 receives the rotary speed signal from measured speed line 220 and a rotary speed set point signal from a rotary speed set point source 218. Rotary speed controller 216C generates and transmits to generator power converter 202 a power conversion control signal on line 222 controlling generator power converter 202's transfer of power or current between AC lines 203 (i.e., from motor/generator 10) and DC bus 204. Rotary speed set point source 218 may convert to the rotary speed set point a power set point P* received from power set point source 224.

A third control loop, voltage control loop 234, controls bus voltage on DC bus 204 to a set point by transferring power or voltage between DC bus 204 and any of (1) Load/Grid 208 and/or (2) energy storage device 210, and/or (3) by transferring power or voltage from DC bus 204 to dynamic brake resistor 214. A sensor measures voltage DC bus 204 and transmits a measured voltage signal over measured voltage line 236. Bus voltage controller 234C receives the measured voltage signal from voltage line 236 and a voltage set point signal V* from voltage set point source 238. Bus voltage controller 234C generates and transmits signals to bi-directional load power converter 206 and bi-directional battery power converter 212 controlling their transmission of power or voltage between DC bus 204, load/grid 208, and energy storage device 210, respectively. In addition, bus voltage controller 234 transmits a control signal to control connection of dynamic brake resistor 214 to DC bus 204.

Power controller 201 regulates temperature to a set point by varying fuel flow, adds or removes power or current to motor/generator 10 under control of generator power converter 202 to control rotor speed to a set point as indicated by bi-directional arrow 242, and controls bus voltage to a set point by (1) applying or removing power from DC bus 204 under the control of load power converter 206 as indicated by bi-directional arrow 244, (2) applying or removing power from energy storage device 210 under the control of battery power converter 212, and (3) by removing power from DC bus 204 by modulating the connection of dynamic brake resistor 214 to DC bus 204.

The structure disclosed in FIGS. 1-2 contains elements interchangeable with elements of the structures shown in the remaining figures.

Figure 3:
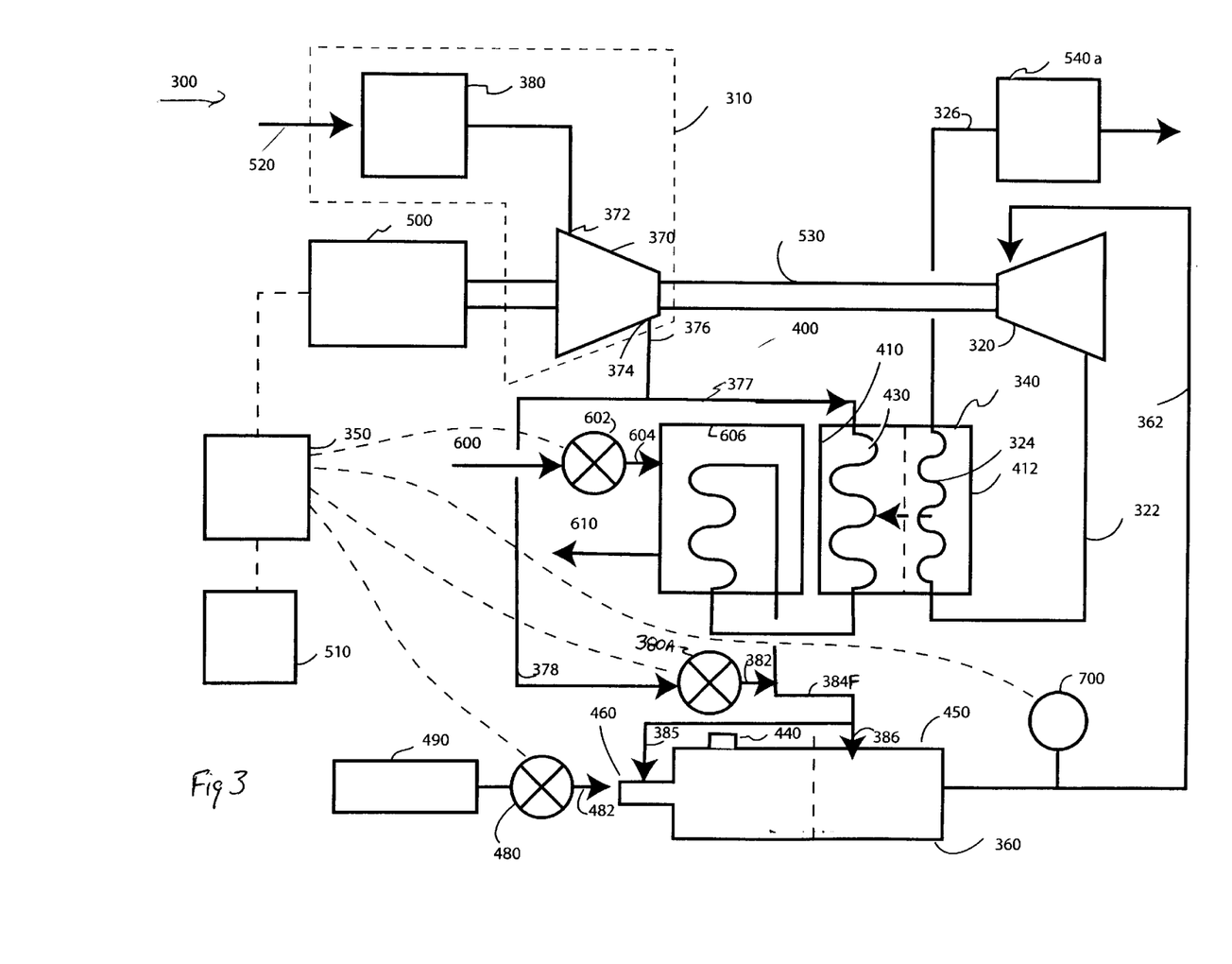
FIG. 3 is a block diagram schematic of a turbogenerator system configured as a power offsetting compressor having hybrid heat input.

Referring now to FIG. 3, power offsetting compressor system 300 may include compressor system 310, turbine 320, recuperator 340, power controller 350, combustor 360, and heat exchanger or mixer 606.

Compressor system 310 includes compressor 370 and air filter 380. Compressor 370 is coupled at an intake side 372 to air filter 380. Compressor 370 is coupled at an outlet side 374 to initial air channel 376. A bifurcated flow path extends from air channel 376 via flow paths 377 and 378. Flow path 377 connects with the high pressure inlet of recuperator 340 and continues through flow passage 430 then to inlet of heat exchanger or mixer 606 joining thereafter with discharge 382 from control valve 380A to form flow 384F. Flow 384F bifurcates into streams 385 and 386. Stream 385 connects to an inlet of fuel injector 460. Stream 386 connects to an inlet of combustor 450. Temperature control flow path 378 connects to the inlet of control valve 380A whose outlet stream is 382.

Fuel supply 490 feeds control valve 480 whose outlet feeds fuel injector 460. Fuel injector 460 is disposed at the intake of combustor and has an inlet for air flow 385 that is mixed with fuel in primary zone 440. Downstream of fuel injector 460, air stream 386 enters combustor 450. Combustor outlet stream 362 connects to the inlet of turbine 320 whose exhaust is connected to the hot side of recuperator 340 at the inlet of passage 324. The intake of hot side 412 of recuperator 340 is coupled to flow path 322 extending from an outlet of turbine 330. Optionally, catalytic converter 540a may be coupled to either the exhaust side of recuperator 340 or the flow path 322. A power offsetting compressor system according to the present disclosure may have one or more fuel injectors 460 controlled by one or more fuel control valves 480.

The rotating parts in each of turbine 320, compressor 370, and motor/generator 500 may be located on a common shaft 530. Motor/generator 500 is electrically connected to power controller 350 which may be connected to grid/load 510. Power controller 350 has electrical connections that may include each of control valve 602, control valve 380, control valve 480 and temperature sensor 700. Temperature sensor 700 may be physically located as shown, between combustor 450 and turbine 320 or alternatively, this temperature may be inferred from temperatures, pressures, or other measurements or combinations thereof taken here or elsewhere. Power controller may be analog or digital, in a currently preferred embodiment of the present disclosure power controller 350 is digital.

Figure 4:
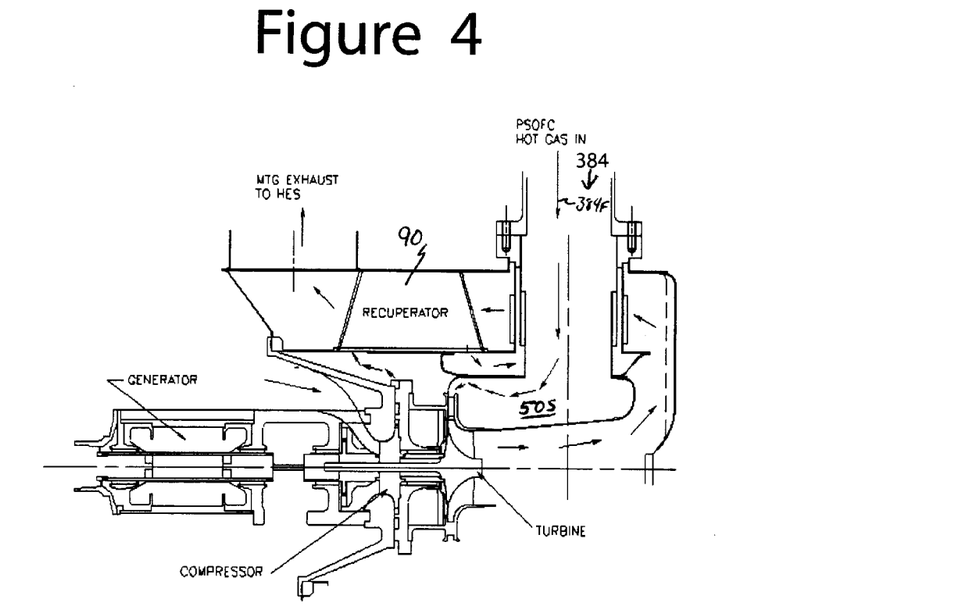
FIG. 4 is a partial longitudinal cross section for a turbogenerator with an annular recuperator.

Referring now to FIG. 4, a partial longitudinal cross section for a turbogenerator with an annular recuperator 90, it illustrates an inlet geometry 384 (see also FIG. 3) that allows connection of an external heat source 600. Passage 384 has its origin at a connecting point external to recuperator 90 and passage 384 extends into the annular combustor cavity 50S, in which fuel injectors 460 (See FIG. 3) are disposed. Passage 384 changes direction by approximately 90 degrees and proceeds to turbine wheel 72 (See FIG. 2).

Figure 5:
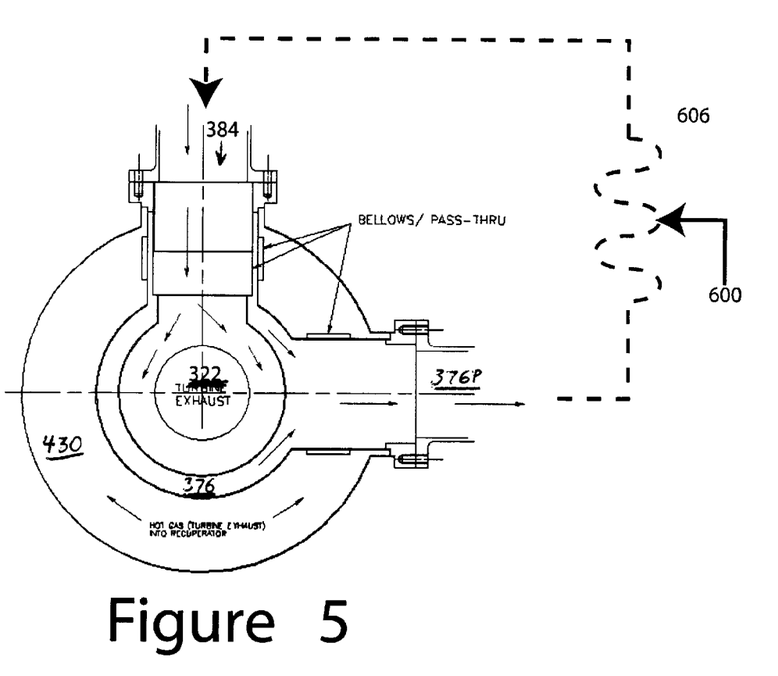
FIG. 5 is a partial section end view taken from the turbine end for a turbogenerator with an annular recuperator.

Referring now to FIG. 5, a partial section end view taken from the turbine end for a turbogenerator with an annular recuperator 90, it illustrates an inlet passage 384 (see also FIG. 3 and FIG. 4) that allows connection of external heat source 600. Connection 376 is a compressor discharge port. External heat source 600 (See also FIG. 3) and heat exchanger/mixer 606 (See also FIG. 3) are shown in phantom. Passage 322 is a generally cylindrical volume which conducts gasses leaving turbine wheel 72 away from turbine wheel and into recuperator passage 430. Passage 384 becomes an annulus centered on passage 322. Passage 376P begins at an annular collection ring 376 centered on and outside passage 322. Passage 376P collects compressed air discharge from compressor 370 (See FIG. 3) and conducts this air to an interface connection external to recuperator 340. Passage 376P is connected to an inlet of heat exchanger/mixer 606 which then connects with passage 384.

During operation, inlet air 520, which is typically at ambient pressure, is drawn through air filter 380 into compressor 370. In compressor 370, inlet air 520 is compressed to a higher pressure. The compressed air then exits compressor 370 at 375 and bifurcates to passages 377, 378. Flow of air 378 bypassing recuperator 340 is controlled by control valve 380. This control valve meters relatively cool air to join with an exhaust stream of heat exchanger/mixer 606 and is one means of controlling temperature 700 downstream of combustor 450. Flow of air 377 entering cold/high pressure side 410 of recuperator 340 is first heated by hot/low pressure passage 324 of recuperator 340. Passage 430 discharges to an inlet of heat exchanger/mixer 606 where heat is normally added to the cycle by an outside source 600 via an optional control valve 602 and control valve outlet 604. The function of 606 as a mixer occurs when stream 600 is at sufficient pressure, in the range of 3 to 30 atmospheres, to be directly mixed with the stream leaving passage 430. In this case, 606 would become a mixing vessel. Control valve 602 is a second possible means of controlling the temperature 700 downstream of combustor 450. Arrow 610 represents an optional exhaust from heat exchanger/mixer 606. A second exhaust from heat exchanger/mixer 606 joins with stream 382 to form stream 384 that bifurcates to provide air stream 385 to fuel injector 460 and air stream 386 downstream of fuel injector 460. The downstream air supply 386 is normally a dilution air supply used to cool combustion products when fuel injector 460 is supporting a flame.

A fuel supply 490 and control valve 480 may be included. The purpose of these components and fuel injector 460 is to augment the heat supplied by stream 600, normally an external source of heat. Control valve 480 is a third possible means of controlling the temperature 700 downstream of combustor 450.

Turbine 320 rotates to produce mechanical energy. Turbine 320 may be coupled to shaft 530. Turbine 320 also may be coupled to compressor 370 and or starter 500. Controller 350 may also provide power to load 510.

Temperature 700 may be maintained within a range supporting performance goals including lifetime goals for the combustor 450, turbine 320, and interconnecting parts 362. Temperature 700 may also be maintained at a level that prevents harmful surge. Speed of shaft 530 may be controlled to match a power requirement set at 510. In the first instance, an independent control loop such as control loop 216 senses speed via the electrical connection between the motor/generator 500 and the digital power controller 350. A target temperature 700 between approximately 1400 and 1700 degrees Fahrenheit is derived from measured speed, a temperature error is computed from actual temperature 700 and target temperature, and one or more of control valves 602, 380, 480 are opened and or closed to adjust the temperature at 700 to eliminate the temperature error. In a second, decoupled control element, the desired power output at 510 between zero Kilowatts and the rated maximum Kilowatts, is used to derive a target speed between approximately 30,000 and 120,000 RPM, the target speed is compared to actual speed, and torque applied by the motor/generator is then adjusted to eliminate the speed error.

In a currently preferred embodiment, a hybrid heat source 600 and heat resulting from combustion of stream 482 combined with stream 385 exists. Elements 378, 380, 382 may be excluded in a currently preferred embodiment of the present disclosure. Control of temperature 700 results by opening control valve 602 to raise temperature 700, closing valve 602 to lower temperature 700, opening valve 480 to raise temperature 700, and closing valve 480 to lower temperature 700. The hybrid heat source 600, 482 allows for constant load capacity at 510 when heat supply 600 from an external source falls below total heat required. Control valve 602 acts to limit temperature 700 when heat supply 600 from an external source exceeds total heat required.

In a second embodiment, a hybrid heat source comprising stream 600 and heat resulting from combustion of stream 482 combined with stream 385 exists. Elements excluded from FIG. 3 in this embodiment are 602, 604. Control of temperature 700 results by opening control valve 380 to lower temperature 700, closing control valve 380 to raise temperature 700, opening control valve 480 to raise temperature 700, and closing control valve 480 to lower temperature 700. The hybrid heat source 600, 482 allows for constant load capacity at 510 when heat supply 600 from an external source falls below total heat required. Control valve 380 acts to limit temperature 700 when heat supply 600 from an external source exceeds total heat required.

Heat source 600 may be one or more of a plurality of suitable heat sources such as Solar collector/receiver, Bio-Mass gasifier/combustor, fuel cell, nuclear energy, or waste heat. Controller 350 may also include the capacity to prioritize from among the plurality of heat sources to optimize the cost of energy generation by a turbogenerator system according to the present disclosure. For example, if solar energy is incident on a solar collector heat source 600, and sufficient heat energy is produced to drive turbine 320 without the addition of any heat from integral heat source, combustor 360, controller 350 may close fuel valve 480. Similarly controller 350 may vary the proportion of heat from two or more heat sources to produce energy at the lowest possible cost. Other priorities may also be considered such as the maintenance impact of using one or more external heat sources, or the reliability of a given heat source, or the need and availability of long term energy from a given heat source. If the incident solar radiation will be declining within a set time period, solar heat may not be the first priority for driving a turbogenerator according to the present disclosure.

Having now described the invention in accordance with the requirements of the patent statutes, those skilled in this art will understand how to make changes and modifications in the present disclosure to meet their specific requirements or conditions. Such changes and modifications may be made without departing from the scope and spirit of the invention as set forth in the following claims.

What is claimed is:

1. A turbogenerator comprising:
a turbogenerator having an integral first heat source for driving the turbogenerator; a one or more external heat sources for driving the turbogenerator;
a controller for controlling the proportion of heat from the first heat source and the one or more external heat sources used to drive the turbogenerator;
a mixer for combining the proportion of heat from the first heat source and the one or more external heat sources;
air for cooling;
a cooling mixer for mixing the cooling air and heat from the one or more external heat sources to prevent damage to the turbogenerator; and
a temperature control loop for controlling the cooling mixer.

2. The turbogenerator of claim 1 further comprising:
one or more selectable parameters for determining the proportion of heat from the first heat source and the one or more external heat sources used to drive the turbogenerator.

3. The turbogenerator of claim 1 wherein the turbogenerator further comprises:
a generator;
a compressor;
a turbine; and
a common shaft for driving the generator, the compressor and the turbine.

4. The turbogenerator of claim 1 wherein the controller further comprises:
a decoupled speed control loop;
the temperature control loop is decoupled; and
a decoupled power control loop.

5. The turbogenerator of claim 1 wherein the one or more external heat sources further comprise one or more of:
a solar collector/receiver;
a bio-mass gasifier/combustor;
a fuel cell;
a nuclear heat source; and
a waste heat source.

6. A method of controlling a turbogenerator comprising the steps of:
providing and integral heat source for driving the turbogenerator;
providing one or more external heat sources for driving the turbogenerator;
selecting a priority for the integral heat source and for the one or more external heat sources;
controlling the heat applied to drive the turbogenerator according to the selected priorities;
providing air for cooling the heat applied to drive the turbogenerator; and
providing two or more decoupled control loops for controlling the turbogenerator, one of the loops controlling the air for cooling.

7. The method of claim 6 wherein the one or more external heat sources further comprise one or more of:
a solar collector/receiver;
a bio-mass gasifier/combustor;
a fuel cell;
a nuclear heat source; and
a waste heat source.

8. In a turbogenerator system having a motor/generator and a compressor and a turbine coupled to a common shaft, the turbine driven by a first heat source, and a control system for controlling the turbogenerator system including a first temperature control loop, the improvement comprising:
a second heat source external to the turbogenerator for driving the turbine;
air for cooling;
means for controlling the air for cooling to cool the second heat source; and
a second temperature control loop independent of the first temperature control loop.

9. In the improved turbogenerator of claim 8 wherein the second heat source further comprise one or more of:
a solar collector/receiver;
a bio-mass gasifier/combustor;
a fuel cell;
a nuclear heat source; and a waste heat source.

* * * * *